(12) United States Patent
Pawar et al.

(10) Patent No.: US 10,187,888 B1
(45) Date of Patent: Jan. 22, 2019

(54) DYNAMIC SELECTION OF FRAME CONFIGURATION

(71) Applicant: Sprint Spectrum LP, Overland Park, KS (US)

(72) Inventors: Hemanth Pawar, Brambleton, VA (US); Shilpa Kowdley, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 35 days.

(21) Appl. No.: 15/416,183

(22) Filed: Jan. 26, 2017

(51) Int. Cl.
*H04W 72/04* (2009.01)
*H04W 8/22* (2009.01)
*H04W 72/12* (2009.01)

(52) U.S. Cl.
CPC ......... *H04W 72/0446* (2013.01); *H04W 8/22* (2013.01); *H04W 72/1263* (2013.01)

(58) Field of Classification Search
CPC ..... H04L 63/30; H04L 5/0053; H04L 61/605; H04L 5/0007; H04L 65/4076; H04L 12/2801; H04L 12/2834; H04L 12/5692; H04L 12/66; H04L 29/06027; H04L 61/2061; H04L 63/304; H04L 65/1069; H04L 12/1863; H04L 12/189; H04L 1/00; H04L 1/1822; H04L 1/1825; H04L 45/16; H04L 5/14; H04M 3/2281; H04M 3/42221; H04M 11/04; H04M 1/656; H04M 1/658; H04M 2250/10; H04M 3/42357; H04M 3/20; H04M 3/42042; H04M 3/56; H04M 7/006; H04M 7/0087; H04M 7/125; H04M 3/2218; H04M 3/42008; H04M 9/08
USPC ....................................................... 370/329
See application file for complete search history.

(56) References Cited

U.S. PATENT DOCUMENTS 9,001,708 B2 * 4/2015 Lim ................... H04B 7/2606
370/280

* cited by examiner

*Primary Examiner* — Natasha W Cosme (57) ABSTRACT

Dynamically selecting a frame configuration as depicted herein includes determining a number of wireless devices within the wireless network that are capable of multiple transmissions using a first frame configuration comprising a first ratio of uplink subframes relative to downlink subframes, comparing the number with a threshold, and selecting a second frame configuration for each of the number of wireless devices based on the comparison. The second frame configuration comprises a second ratio of uplink subframes relative to downlink subframes that is different from the first ratio.

20 Claims, 5 Drawing Sheets

DYNAMIC SELECTION OF FRAME CONFIGURATION

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Air interface resources deployed by access nodes, such as resource blocks, are typically allocated between uplink transmissions, i.e. transmissions from a wireless device to an access node, and downlink transmissions, i.e. transmissions from the access node to the wireless device. With increasing numbers of wireless devices connecting to various access nodes, and various transmission modes such as multiple-input-multiple-output (MIMO) and coordinated multipoint (CoMP), it is becoming increasingly imperative to balance the resource allocation between uplink and downlink transmissions to maximize efficient usage of air-interface resources.

Overview

Exemplary embodiments described herein include systems, methods, and processing nodes selecting frame configurations based on a number of wireless devices capable of multiple uplink and/or downlink transmissions. An exemplary method for selecting a frame configuration in a wireless network includes determining a number of wireless devices within the wireless network that are capable of multiple transmissions using a first frame configuration comprising a first ratio of uplink subframes relative to downlink subframes, comparing the number with a threshold and, upon determining that the number meets the threshold, selecting a second frame configuration for each of the number of wireless devices. The second frame configuration includes a second ratio of uplink subframes relative to downlink subframes that is different from the first ratio.

An exemplary system for selecting a frame configuration in a wireless network includes a processing node and a processor coupled to the processing node. The processor configures the processing node to perform operations including determining a number of wireless devices within the wireless network that are capable of multiple uplink transmissions using a first frame configuration, comparing the number with a first threshold and, upon determining that the number meets the first threshold, selecting a second frame configuration for each of the number of wireless devices. The second frame configuration includes a greater number of downlink subframes relative to uplink subframes than the first frame configuration.

An exemplary processing node for selecting a frame configuration in a wireless network is configured to perform operations including determining a number of wireless devices within the wireless network that are capable of multiple downlink transmissions using a first frame configuration, comparing the number with a first threshold and, upon determining that the number meets the first threshold, selecting a second frame configuration for each of the number of wireless devices. The second frame configuration includes a greater number of uplink subframes relative to downlink subframes than the first frame configuration.

DETAILED DESCRIPTION

In embodiments disclosed herein, a number (i.e. quantity) is determined of wireless devices within a wireless network that are capable of engaging in multiple transmission streams with one or more access nodes. The determination of the number of wireless devices that are capable of multiple uplink or downlink transmissions may be based on active transmissions by each of the wireless devices, a device capability of each of the wireless devices, or any combination of active transmissions and a device capability of each of the wireless devices. The multiple transmissions can include transmissions between one or more wireless devices and a single access node, such as a multiple input multiple output (MIMO) transmission, including multi-user (MU) MIMO and single-user (SU) MIMO. The multiple transmissions can also include transmissions between a wireless device and multiple access nodes, such as coordinated multi-point (CoMP) transmission. During CoMP transmission, at least two access nodes in communication with the wireless device can coordinate scheduling of the multiple transmissions with each other via a direct connection between said at least two access nodes. As will be appreciated by those having ordinary skill in the art, wireless devices capable of uplink MIMO or CoMP will utilize uplink resources more efficiently, and wireless devices capable of downlink MIMO or CoMP will utilize downlink resources more efficiently.

The number of wireless devices capable of multiple transmissions (such as MIMO or CoMP) is compared with a threshold, and based on whether or not the number meets the threshold, a frame configuration is selected. The frame configuration is one of a plurality of frame configurations, and each frame configuration comprises a data frame having a sequence of uplink and downlink subframes in a specified ratio for a fixed time interval, along with one or more special subframes. Based on the comparison of the number of wireless devices with the threshold, a frame configuration may be selected that has a different ratio of uplink subframes relative to downlink subframes than a frame configuration currently being used in the wireless network. For example, if the number of wireless devices that are engaged in (or are capable of engaging in) multiple uplink transmissions is large, then the selected frame configuration comprises fewer uplink subframes relative to downlink subframes than the current frame configuration, since fewer uplink resources (i.e. subframes) are required by the number of wireless devices, thereby enabling more downlink resources to become available. Conversely, if the number of wireless devices that are engaged in (or are capable of engaging in) multiple downlink transmissions is large, then the selected frame configuration comprises fewer downlink subframes relative to uplink subframes than the current frame configuration, since fewer downlink resources are required by the number of wireless devices, thereby enabling more uplink resources to become available.

The operations disclosed herein may be performed by one or more of a serving access node, a controller node, or any other network node, alone or in any combination, as further described below with respect to the embodiments depicted in FIGS. 1-5.

Figure 1:
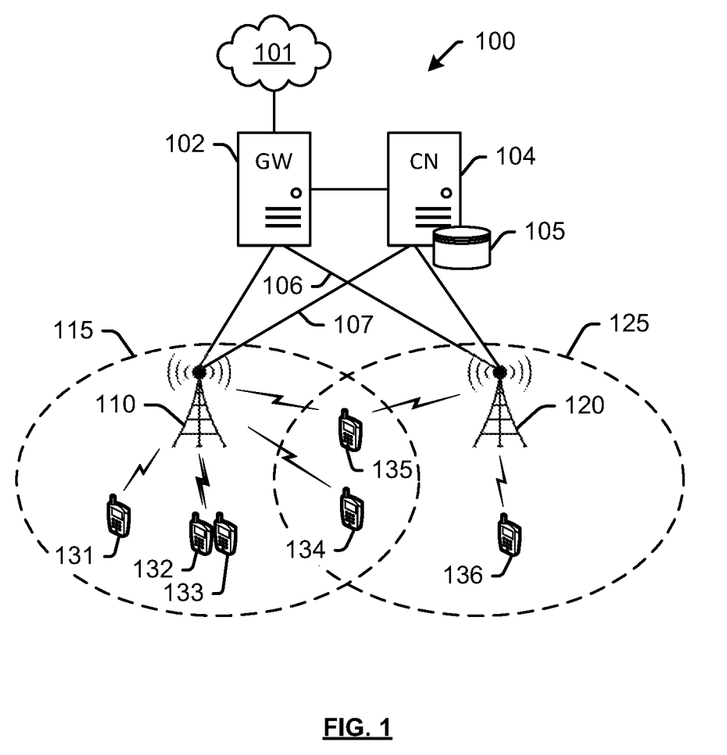
FIG. 1 depicts an exemplary system 100 for selecting a frame configuration in a wireless network.

FIG. 1 depicts an exemplary system 100 for selecting a frame configuration in a wireless network. System 100 comprises a communication network 101, gateway 102, controller node 104, access nodes 110 and 120, and end-user wireless devices 131, 132, 133, 134, 135, and 136. Access node 110 is illustrated as having a coverage area 115 and access node 120 is illustrate as having a coverage area 125. Wireless devices 131, 132, and 133 are illustrated as being located within coverage area 115 and accessing network services directly from access node 110. For example, wireless device 131 may communicate with access node 110 using a standard wireless transmission path, such as LTE, while wireless devices 132, 133 may communicate with access node 110 using a multiple transmission (such as, for instance, MU-MIMO). Further, wireless devices 134 and 135 are depicted as being within both coverage areas 115 and 125, with wireless device 134 accessing network services from access node 110 via a standard transmission path, and wireless device 135 accessing network services from both access nodes 110 and 120 via multiple transmission paths (such, for instance, CoMP). Finally, wireless device 136 is illustrated as being within coverage area 125, and accessing network services directly from access node 120 via a standard transmission path.

In operation, a number of wireless devices among wireless devices 131-136 may be capable of engaging in multiple transmission streams with one or more of access nodes 110, 120. For example, wireless devices 132 and 133 are depicted as engaging in multiple transmission streams by sharing the same wireless resources deployed by access node 110 using, for instance, MU-MIMO, and wireless device 135 is capable of to simultaneously communicating with access nodes 110 and 120 using, for instance, CoMP. The determination of the number of wireless devices that are capable of multiple uplink or downlink transmissions may be based on active transmissions, i.e. the multiple transmissions engaged in by each of wireless devices 132, 133, 135. Alternatively or in addition, the determination of the number of wireless devices that are capable of multiple transmissions may be based on a device capability of each of the wireless devices. The device capability may be based on each wireless device meeting one or more criteria for downlink/uplink CoMP/ MIMO transmissions such as, for instance, a device type, subscription plan, transceiver capability, or any other attribute. In one exemplary embodiment, the number of wireless devices capable of multiple transmissions comprises an aggregate or total of the devices engaged in active multiple transmissions and devices that have the capability of engaging in multiple transmissions, whether or not they are active. Any other combination of active transmissions and device capability may be used to determine the number of wireless devices.

This number is compared with a configurable threshold in order to determine a frame configuration from among a plurality of frame configurations to be implemented within system 100. Each of the plurality of frame configurations comprises a different ratio of uplink subframes to downlink subframes. For example, in a time division duplex (TDD) network, the system bandwidth is shared between uplink and downlink, with the sharing being performed by allotting different periods of time (e.g. transmission time intervals or TTIs) to uplink and downlink transmission. In LTE systems, a data transmission frame (or simply "frame") is about 10 ms in duration and comprises 10 subframes, each of which is about 1 ms in duration. For example, a frame of 10 ms in duration may comprise a number of subframes of 1 ms in duration (i.e., TTIs), arranged in a sequence of uplink subframes and downlink subframes. In some embodiments, a special subframe may also be used, for instance, as a guard between an uplink subframe and a downlink subframe or for any other suitable purpose, as depicted in Table 1 below:

TABLE 1

| Frame Config. | Frame Configurations Subframe (SF0-SF9) | | | | | | | | |
|---|---|---|---|---|---|---|---|---|---|
| (FC1-FCn) | SF0 | SF1 | SF2 | SF3 | SF4 | SF5 | SF6 | SF7 | SF8 | SF9 |
| FC0 | D | S | U | U | U | D | S | U | U | U |
| FC1 | D | S | U | U | D | D | S | U | U | D |
| FC2 | D | S | U | D | D | D | S | U | D | D |
| FC3 | D | S | U | U | U | D | D | D | D | D |
| FC4 | D | S | U | U | D | D | D | D | D | D |
| FC5 | D | S | U | D | D | D | D | D | D | D |
| FC6 | D | S | U | U | U | D | S | U | U | D |
| ... | | | | | | ... | | | | |
| FCn | D | S | U | F | F | D | S/D | F | F | F |

Each frame configuration in Table 1 comprises 10 subframes SF0-SF9, and each frame configuration FC0-FCn comprises a different ratio of downlink (D), uplink (U), and special (S) subframes. Other frame configurations may comprise various other sequences of special, downlink, and uplink subframes. LTE standards have prescribed seven known frame configurations (FC0-FC6 in Table 1) that can be selected from at any time by a network node, such as an access node or controller node. In other embodiments, such as in an enhanced interference mitigation and traffic adaptation (eIMTA) system within an LTE network, a frame configuration may comprise one or more flexible subframes that can be dynamically adjusted to either be downlink, uplink, or special subframes. See, for instance, configuration FCn with flexible subframes (F) in Table 1. When using a TDD frame structure, an uplink subframe and a downlink subframe may be transmitted over the same frequency at different times. Moreover, different frame configurations comprise different ratios of uplink subframes and/or downlink subframes. For the purposes of the subject disclosure, a frame configuration is not limited to existing known frame configurations, but can be any sequence of uplink and downlink subframes that can be appreciated by those having ordinary skill in the art in light of this disclosure.

As described herein, different frame configurations may be selected based on the number of wireless devices capable of engaging in multiple uplink and/or downlink transmissions, thereby enabling efficient allocation of resources to meet load conditions of the air interface of an access node. For example, the number of wireless devices 131-136 capable of multiple transmissions may be compared with a configurable threshold that is defined based on an availability or usage of uplink and downlink resources in system 100. Upon the number meeting or exceeding a threshold, a frame configuration may be selected that has a different ratio of uplink subframes relative to downlink subframes than a frame configuration currently being used within system 100. For example, if the number of wireless devices 131-136 that are engaged in (or are capable of engaging in) multiple uplink transmissions is large, then the selected frame configuration comprises fewer uplink subframes relative to downlink subframes than the current frame configuration, since fewer uplink resources (i.e. subframes) are required, thereby enabling more downlink resources to become available. With respect to the frame configurations described in table 1, for instance, if the current (i.e. first) frame configuration is FC1, then FC2 would be selected, since it comprises fewer uplink subframes relative to downlink subframes. Conversely, if the number of wireless devices 131-136 that are engaged in (or are capable of engaging in) multiple downlink transmissions is large, then the selected frame configuration comprises fewer downlink subframes relative to uplink subframes than the current frame configuration, since fewer downlink resources are required. In other words, with respect to the frame configurations depicted in Table 1, FC1 would be selected over FC2. Other selections will be apparent to those of ordinary skill in the art in light of this disclosure.

Access nodes 110, 120 can be any network node configured to provide communication between end-user wireless devices 131-136 and communication network 101, including standard access nodes and/or short range, low power, small access nodes. For instance, access nodes 110, 120 may include any standard access node, such as a macrocell access node, base transceiver station, a radio base station, an eNodeB device, an enhanced eNodeB device, or the like. In an exemplary embodiment, a macrocell access node can have a coverage area 115, 125 in the range of approximately five kilometers to thirty-five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can each receive instructions and other input at a user interface. Access nodes 110, 120 communicate with gateway node 102 and controller node 104 via communication links 106, 107. Access nodes 110, 120 may communicate with other access nodes (not shown) using a direct link such as an X2 link or similar.

Wireless devices 131-136 may be any device, system, combination of devices, or other such communication platform capable of communicating wirelessly with access nodes 110, 120 using one or more frequency bands deployed therefrom. Each of wireless devices 131-136 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-136. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing wireless device capabilities of wireless devices 131-136, among others, as well as predefined or dynamic thresholds and associations thereof with frame configurations, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
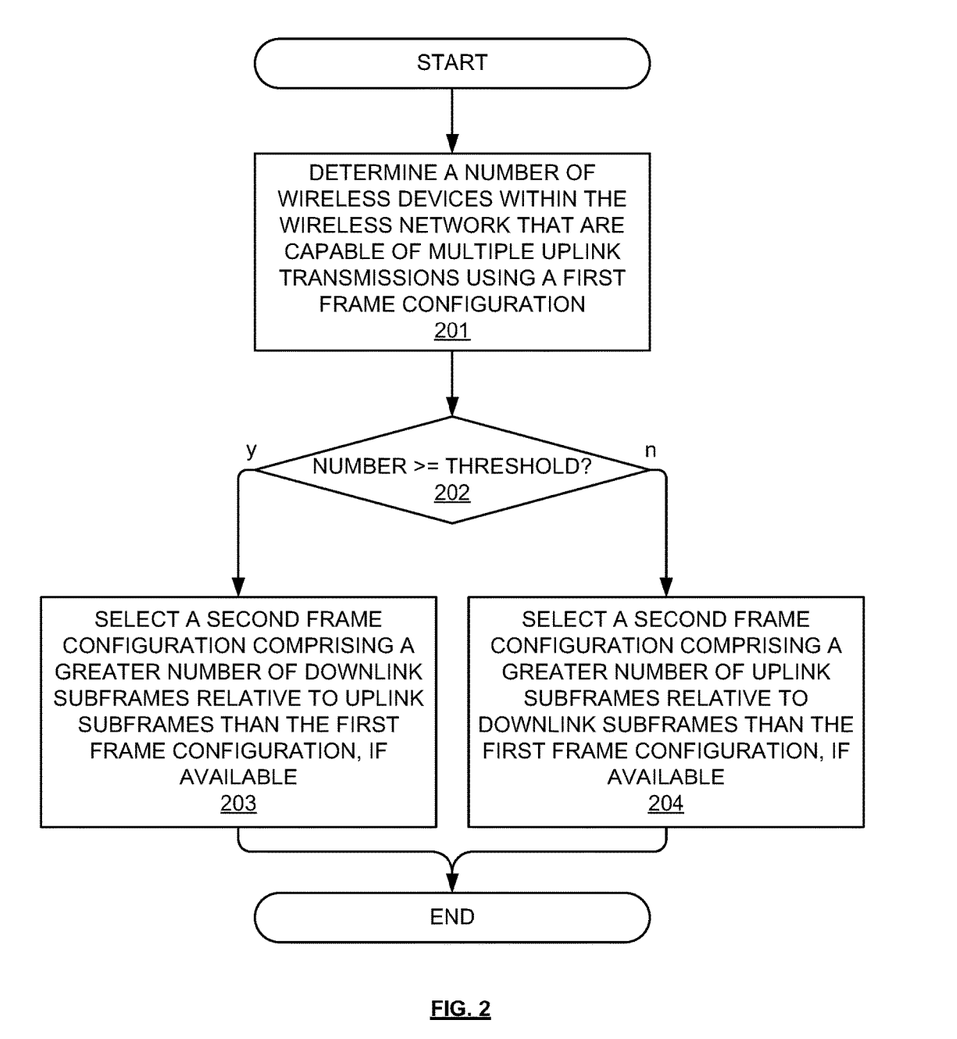
FIG. 2 depicts an exemplary method for selecting a frame configuration in a wireless network based on a number of wireless devices capable of multiple uplink transmissions.

FIG. 2 depicts an exemplary method for selecting a frame configuration in a wireless network. The method of FIG. 2 may be implemented by an access node, such as one of access nodes 110, 120 in FIG. 1, controller node 104, or any other network node. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Figure 4A:
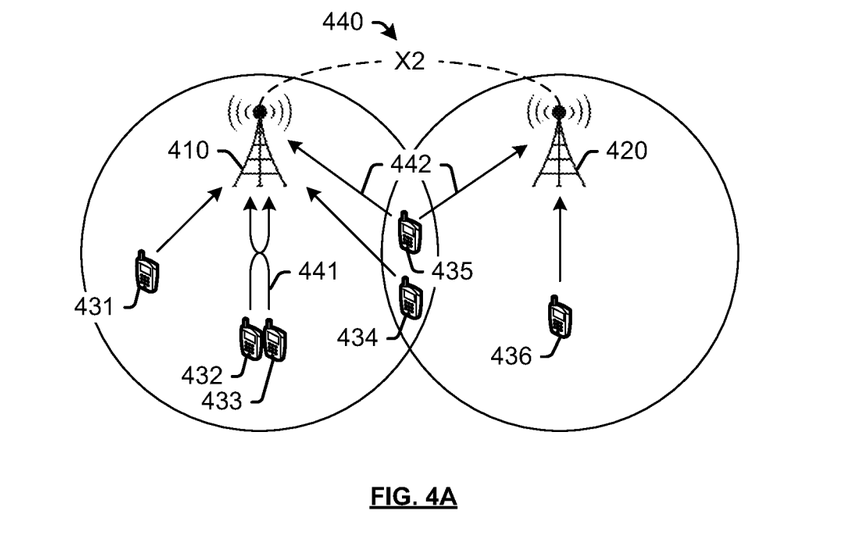
FIGS. 4A-4B depict exemplary systems for selecting a frame configuration in a wireless network based on a number of wireless devices capable of multiple uplink and downlink transmissions respectively.

At 201, a determination is made of a number of wireless devices within a wireless network that are capable of engaging in multiple uplink transmission streams with one or more access nodes is determined. FIG. 4A depicts a system corresponding to the method described in FIG. 2, wherein a number of wireless devices 431-436 are engaged in uplink transmission with one or both of access nodes 410, 420. The determination of the number of wireless devices 431-436 that are capable of multiple uplink transmissions may be based on active multiple transmissions by each of the wireless devices using a first (or default) frame configuration, or a device capability of each of the wireless devices, or any combination of active transmissions and a device capability of each of the wireless devices. For example, the multiple uplink transmissions can include MU-MIMO transmission 441 from wireless devices 432, 433 to access node 410. The multiple uplink transmissions can also include transmissions 442 from wireless device 435 to both of access nodes 410 and 420, such as coordinated multi-point (CoMP) uplink transmission. During uplink CoMP transmission, access nodes 410, 420 can coordinate the scheduling of multiple uplink transmissions 442 with each other via a direct connection between access nodes 410, 420, such as X2 connection 440.

Referring back to FIG. 2, at 202, the number of wireless devices capable of multiple uplink transmissions (such as uplink MIMO or uplink CoMP) is compared with a threshold, and based on whether or not the number meets the threshold, a frame configuration is selected at 203 or 204. The frame configuration can be any one of a plurality of frame configurations as described above in Table 1 that depicts each frame configuration as having a sequence of uplink and downlink subframes in a specified ratio. For example, if a large (i.e. threshold) number of wireless devices are capable of uplink MIMO or CoMP, uplink resources are more efficiently utilized, thereby enabling allocation of additional downlink resources. Therefore, at 203, a frame configuration is selected that has a greater number of downlink subframes relative to uplink subframes than the first or default frame configuration (such as FC2 over FC1). Conversely, if a small (i.e. below threshold) number of wireless devices are capable of uplink MIMO or CoMP, uplink resources are less efficiently utilized. Therefore, at 204, a frame configuration is selected that has a greater number of uplink subframes relative to downlink subframes than the first or default frame configuration (such as FC1 over FC2). In some embodiments, a frame configuration having a greater proportion of downlink subframes (as selected in step 203) or a greater proportion of uplink subframes (as selected in step 204) may not be available. For instance, the lowest possible proportion of downlink subframes may already be selected as a default or first frame configuration. However, to the extent that a frame configuration having a different ratio of uplink to downlink subframes is available, such a frame configuration is selected.

Figure 3:
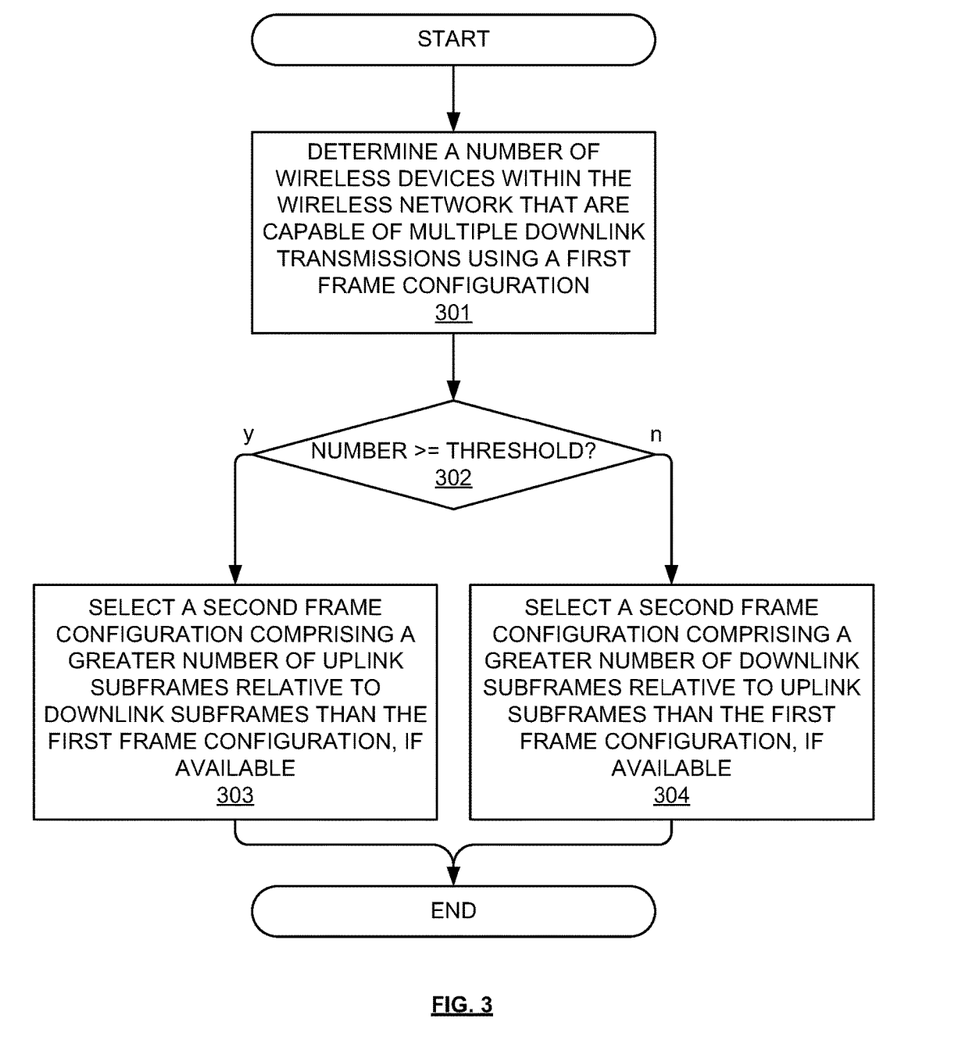
FIG. 3 depicts an exemplary method for selecting a frame configuration in a wireless network based on a number of wireless devices capable of multiple downlink transmissions.

FIG. 3 depicts an exemplary method for selecting a frame configuration in a wireless network. In contrast with the method of FIG. 2, the method of FIG. 3 corresponds to a determination of a number of wireless devices capable of multiple downlink transmissions. However, similar to the method of FIG. 2, the method of FIG. 3 may be implemented by an access node, such as one of access nodes 110, 120 in FIG. 1, controller node 104, or any other network node. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Figure 4B:
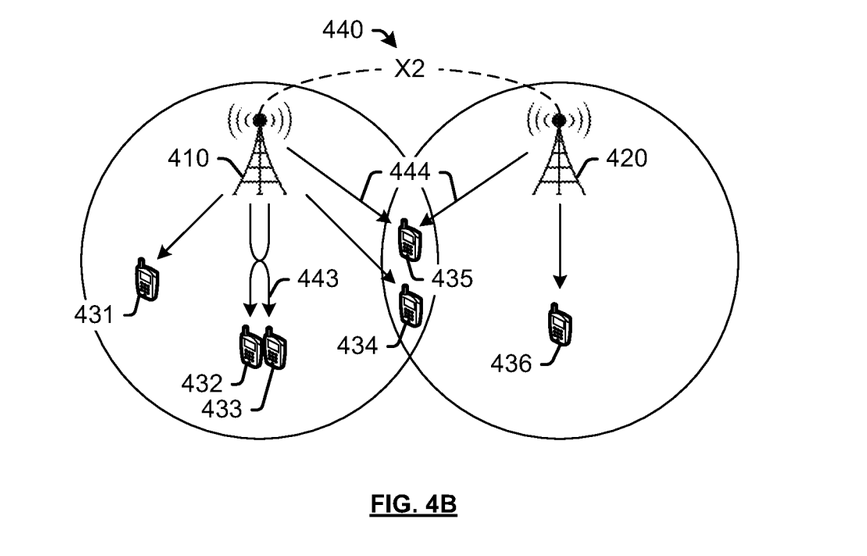

At 301, a determination is made of a number of wireless devices within a wireless network that are capable of engaging in multiple downlink transmission streams with one or more access nodes is determined. FIG. 4B depicts a system corresponding to the method described in FIG. 3, wherein a number of wireless devices 431-436 are engaged in downlink transmission with one or both of access nodes 410, 420. The determination of the number of wireless devices 431-436 that are capable of multiple downlink transmissions may be based on active multiple transmissions by each of the wireless devices using a first (or default) frame configuration, or a device capability of each of the wireless devices, or any combination of active transmissions and a device capability of each of the wireless devices. For example, the multiple downlink transmissions can include downlink MU-MIMO transmission 443 from access node 410 to wireless devices 432, 433. The multiple downlink transmissions can also include transmissions 444 both of access nodes 410 and 420 to wireless device 435, such as coordinated multi-point (CoMP) downlink transmission. During downlink CoMP transmission, access nodes 410, 420 can coordinate the multiple downlink transmissions 444 with each other via a direct connection between access nodes 410, 420, such as X2 connection 440.

Referring back to FIG. 3, at 302, the number of wireless devices capable of multiple downlink transmissions (such as MIMO or CoMP) is compared with a threshold, and based on whether or not the number meets the threshold, a frame configuration is selected at 303 or 304. The frame configuration can be any one of a plurality of frame configurations as described above in Table 1 that depicts each frame configuration as having a sequence of uplink and downlink subframes in a specified ratio. For example, if a large (i.e. threshold) number of wireless devices are capable of downlink MIMO or CoMP, downlink resources are more efficiently utilized, thereby enabling allocation of additional uplink resources. Therefore, at 303, a frame configuration is selected that has a greater number of uplink subframes relative to downlink subframes than the first or default frame configuration. Conversely, if a small (i.e. below threshold) number of wireless devices are capable of downlink MIMO or CoMP, downlink resources are less efficiently utilized. Therefore, at 304, a frame configuration is selected that has a greater number of downlink subframes relative to uplink subframes than the first or default frame configuration. Note that this is in contrast to the embodiment described in FIG. 2. Moreover, in some embodiments, a frame configuration having a greater proportion of uplink subframes (as selected in step 303) or a greater proportion of downlink subframes (as selected in step 304) may not be available. For instance, the lowest possible proportion of uplink subframes may already be selected as a default or first frame configuration. However, to the extent that a frame configuration having a different ratio of uplink to downlink subframes is available, such a frame configuration is selected.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, controller node 104, and/or network 101.

Figure 5:
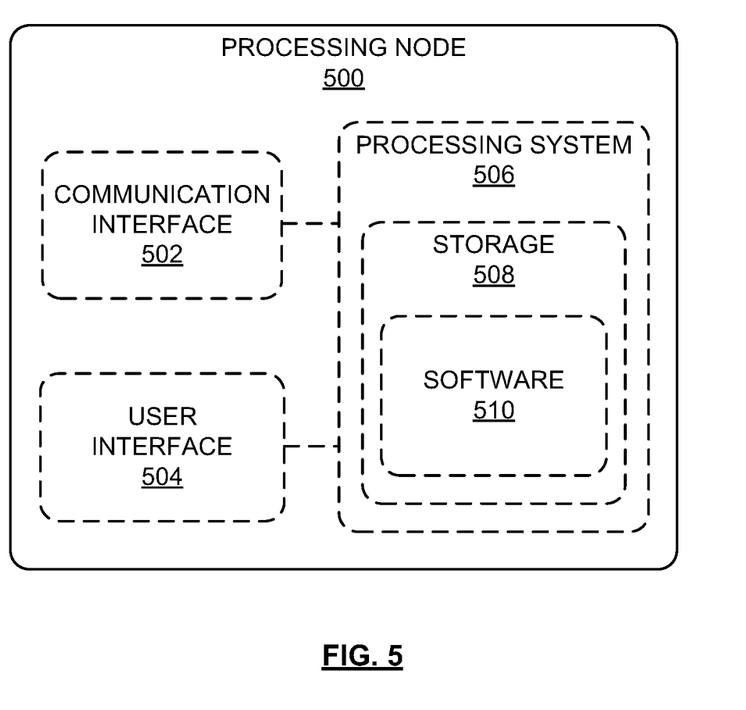
FIG. 5 depicts an exemplary processing node for data transmission using frame reconfiguration.

FIG. 5 depicts an exemplary processing node 500 for data transmission using frame reconfiguration. Processing node 500 comprises a communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a scheduler module. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion.

The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a frame configuration in a wireless network, the method comprising:
   determining a number of wireless devices within the wireless network that are capable of multiple transmissions using a first frame configuration comprising a first ratio of uplink subframes relative to downlink subframes;
   comparing the number with a threshold; and
   upon determining that the number meets the threshold, selecting a second frame configuration for each of the number of wireless devices, the second frame configuration comprising a second ratio of uplink subframes relative to downlink subframes that is different from the first ratio.

2. The method of claim 1, wherein:
   the multiple transmissions comprise multiple uplink transmissions, and
   the second ratio comprises fewer uplink subframes relative to downlink subframes than the first ratio.

3. The method of claim 1, wherein:
   the multiple transmissions comprise multiple downlink transmissions, and
   the second ratio comprises more uplink subframes relative to downlink subframes than the first ratio.

4. The method of claim 1, wherein the determination of the number of wireless devices that are capable of multiple transmissions is based on active transmissions by each of the wireless devices.

5. The method of claim 1, wherein the determination of the number of wireless devices that are capable of multiple transmissions is based on a device capability of each of the wireless devices.

6. The method of claim 1, wherein the determination of the number of wireless devices that are capable of multiple transmissions is based on a combination of active transmissions and a device capability of each of the wireless devices.

7. The method of claim 1, wherein the multiple transmissions comprise transmissions between each wireless device and at least two access nodes.

8. The method of claim 7, wherein the at least two access nodes coordinate the multiple transmissions with each other.

9. The method of claim 1, wherein the multiple transmissions comprise transmissions that utilize the same resource block shared between two of the wireless devices.

10. The method of claim 9, wherein the two of the wireless devices utilize orthogonal transmissions.

11. The method of claim 1, further comprising determining that the number does not meet the threshold, and selecting the first frame configuration.

12. A system for selecting a frame configuration in a wireless network, the system comprising:
   a processing node; and
   a processor coupled to the processing node, the processor for configuring the processing node to perform operations comprising:
      determining a number of wireless devices within the wireless network that are capable of multiple uplink transmissions using a first frame configuration;
      comparing the number with a first threshold; and
      upon determining that the number meets the first threshold, selecting a second frame configuration for each of the number of wireless devices, the second frame configuration comprising a greater number of downlink subframes relative to uplink subframes than the first frame configuration.

13. The system of claim 12, wherein the determination of the number of wireless devices that are capable of multiple uplink transmissions is based on a combination of active uplink transmissions and a device capability of each of the wireless devices.

14. The system of claim 12, wherein the multiple uplink transmissions comprise transmissions from each wireless device to at least two access nodes.

15. The system of claim 12, wherein the multiple uplink transmissions comprise uplink transmissions from at least two wireless devices and share the same resource block.

16. The system of claim 12, wherein the operations further comprise determining that the number meets a second threshold higher than the first threshold; and selecting a third frame configuration comprising a greater number of downlink subframes relative to uplink subframes than the second frame configuration.

17. A processing node for selecting a frame configuration in a wireless network, processing node being configured to perform operations comprising:
   determining a number of wireless devices within the wireless network that are capable of multiple downlink transmissions using a first frame configuration;
   comparing the number with a first threshold; and
   upon determining that the number meets the first threshold, selecting a second frame configuration for each of the number of wireless devices, the second frame configuration comprising a greater number of uplink subframes relative to downlink subframes than the first frame configuration.

18. The processing node of claim 17, wherein the multiple downlink transmissions comprise transmissions at least two access node to one of the wireless devices.

19. The processing node of claim 17, wherein the multiple downlink transmissions comprise downlink transmissions to at least two wireless devices and share the same resource block.

20. The processing node of claim 17, wherein the operations further comprise determining that the number meets a second threshold higher than the first threshold; and selecting a third frame configuration comprising a greater number of uplink subframes relative to downlink subframes than the second frame configuration.

* * * * *